United States Patent
Suyama et al.

(10) Patent No.: US 10,253,422 B2
(45) Date of Patent: Apr. 9, 2019

(54) CONTINUOUS ELECTROLYSIS METHOD WITH ELECTROLYTIC BATH FOR POLYSULFIDE PRODUCTION AND ELECTROLYSIS DEVICE FOR IMPLEMENTING THE SAME

(71) Applicants: NIPPON PAPER INDUSTRIES CO., LTD., Tokyo (JP); PERMELEC ELECTRODE LTD., Kanagawa (JP)

(72) Inventors: Kenichiro Suyama, Tokyo (JP); Kazuhiro Kurosu, Tokyo (JP); Masaaki Kato, Okayama (JP); Hideo Otsu, Okayama (JP)

(73) Assignees: NIPPON PAPER INDUSTRIES CO., LTD., Tokyo (JP); PERMELEC ELECTRODE LTD., Kanagawa (JP)

(*) Notice: Subject to any disclaimer, the term of this patent is extended or adjusted under 35 U.S.C. 154(b) by 0 days.

(21) Appl. No.: 15/917,847

(22) Filed: Mar. 12, 2018

(65) Prior Publication Data
US 2018/0195189 A1    Jul. 12, 2018

Related U.S. Application Data

(62) Division of application No. 14/432,484, filed as application No. PCT/JP2013/077191 on Sep. 30, 2013, now Pat. No. 9,951,432.

(30) Foreign Application Priority Data

Oct. 1, 2012  (JP) ................................ 2012-219899

(51) Int. Cl.
*C25B 15/02*  (2006.01)
*C02F 1/46*  (2006.01)
(Continued)

(52) U.S. Cl.
CPC ............ *C25B 15/02* (2013.01); *C02F 1/4602* (2013.01); *C02F 1/46109* (2013.01); *C25B 1/00* (2013.01);
(Continued)

(58) Field of Classification Search
CPC .. C25B 15/02; C25B 1/00; C25B 1/14; C25B 9/08; C25B 15/08; C02F 1/46102;
(Continued)

(56) References Cited

U.S. PATENT DOCUMENTS

| | | | |
|---|---|---|---|
| 5,277,768 A * | 1/1994 | Twardowski | C25B 15/00 205/349 |
| 5,624,545 A * | 4/1997 | Landfors | D21C 11/0042 205/494 |
| 2009/0242422 A1* | 10/2009 | Kurosu | C25B 1/14 205/350 |

OTHER PUBLICATIONS

"Office Action of India Counterpart Application," dated Aug. 23, 2018, p. 1-p. 6.
(Continued)

*Primary Examiner* — Ciel P Thomas
(74) *Attorney, Agent, or Firm* — JCIPRNET

(57) ABSTRACT

An electrolysis method of preventing the voltage of an electrolytic bath from rising over time without halting electrolysis and an electrolysis device for executing the method are provided such that: in operation of a two-compartment electrolytic bath, which has a membrane partitioning an anode compartment from a cathode compartment and in which a sulfide ion-containing white liquor for use in a pulp production process is fed into the anode compartment while direct current is supplied to the electrolytic bath to produce polysulfide in the anode compartment through electrolysis, and a sulfide ion-containing white
(Continued)

liquor for use in a pulp production process that contains at least one of a scale cleaning agent and a scale inhibitor is fed to the anode compartment.

3 Claims, 5 Drawing Sheets

(51) Int. Cl.
    *C25B 15/08*     (2006.01)
    *C25B 1/00*     (2006.01)
    *C25B 1/14*     (2006.01)
    *D21C 11/00*     (2006.01)
    *D21C 3/02*     (2006.01)
    *C25B 9/08*     (2006.01)
    *C02F 1/461*     (2006.01)

(52) U.S. Cl.
    CPC .................. *C25B 1/14* (2013.01); *C25B 9/08* (2013.01); *C25B 15/08* (2013.01); *D21C 3/02* (2013.01); *D21C 11/0042* (2013.01); *C02F 2001/46119* (2013.01); *C02F 2201/4611* (2013.01)

(58) Field of Classification Search
    CPC ........ C02F 1/46109; C02F 2001/46119; C02F 2201/4611; D21C 15/08; D21C 11/9942; D21C 3/02
    See application file for complete search history.

(56) References Cited

OTHER PUBLICATIONS

"Office Action of Malaysia Counterpart Application," dated Sep. 28, 2018, p. 1-p. 3.

\* cited by examiner

CONTINUOUS ELECTROLYSIS METHOD WITH ELECTROLYTIC BATH FOR POLYSULFIDE PRODUCTION AND ELECTROLYSIS DEVICE FOR IMPLEMENTING THE SAME

CROSS-REFERENCE TO RELATED APPLICATION

This application is a divisional application of U.S. application Ser. No. 14/432,484, filed on Mar. 31, 2015, now allowed. The application Ser. No. 14/432,484 is a 371 application of the international PCT application serial no. PCT/JP2013/077191, filed on Sep. 30, 2013, which claims the priority benefit of Japan application no. 2012-219899, filed on Oct. 1, 2012. The entirety of each of the above-mentioned patent applications is hereby incorporated by reference herein and made a part of specification.

TECHNICAL FIELD

The present disclosure relates to a continuous electrolysis method using an electrolytic bath for polysulfide production and to an electrolysis device for implementing the method. The present disclosure more particularly relates to a method for continuous and maintenance-free operation of a white liquor electrolysis device, i.e., a white liquor electrolytic bath and its peripheral equipment, intended for production of polysulfide.

BACKGROUND

Raising chemical pulp yields is an important issue for effective utilization of wood resources, i.e., for achieving effective utilization of wood resources. A polysulfide cooking process is one technology for raising the yield of kraft pulps, which are the predominant chemical pulps. A cooking liquor in a polysulfide cooking process is produced by oxidation of an aqueous alkaline solution that contains sodium sulfide, i.e., white liquor, with molecular oxygen, e.g., air, in the presence of a catalyst, e.g., active carbon, as shown by the reaction formula (1) below (Patent Document 1, Patent Document 2).

Using this method, a polysulfide cooking liquor having a polysulfide sulfur concentration of about 5 g/L can be obtained with a selectivity of about 60% and a conversion rate of about 60% on a sulfide ion basis. However, when the conversion rate is raised with this method, the thiosulfate ion, which makes absolutely no contribution to cooking, is secondarily produced in large amounts by secondary reactions as shown by the reaction formulas (2) and (3) below, and as a consequence it has been quite difficult to produce a cooking liquor containing high concentrations of polysulfide sulfur with high selectivities.

[C1]

$$4Na_2S + O_2 + 2H_2O \rightarrow 2Na_2S_2 + 4NaOH \quad (1)$$

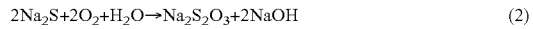

$$2Na_2S + 2O_2 + H_2O \rightarrow Na_2S_2O_3 + 2NaOH \quad (2)$$

$$2Na_2S_2 + 3O_2 \rightarrow 2Na_2S_2O_3 \quad (3)$$

Here, polysulfide sulfur, which is also indicated by PS-S, refers to 0-valent sulfur in, for example, sodium polysulfide $Na_2S_x$, i.e., (x−1) sulfur atoms. Further, sulfur in the polysulfide ion corresponding to sulfur with oxidation number of −2 (one sulfur atom per $S_x^{2-}$ or $Na_2S_x$) and sulfide ion ($S^{2-}$) are collectively referred to in this Description as $Na_2S$-state sulfur. The liter volume unit is represented by L in this Description.

Meanwhile, Patent Document 3 discloses a method for electrolytic production of a polysulfide cooking liquor. This method is a polysulfide production method that is characterized by production of polysulfide ion through electrolytic oxidation by introducing a sulfide ion-containing solution into the anode compartment of an electrolytic bath that comprises: an anode compartment in which a porous anode is disposed, wherein the porous anode has a physically continuous three-dimensional mesh structure, at least the surface of which is composed of nickel or a nickel alloy containing nickel by at least 50 weight % (weight %=mass % here and below) and the surface area of the anode per unit volume of the anode compartment is 500 to 20,000 $m^2/m^3$; a cathode compartment in which a cathode is disposed; and a membrane that partitions the anode compartment from the cathode compartment.

With reference to a method for cleaning a membrane on which impurities have become deposited, Patent Document 4 describes a method in which the membrane of an electrolytic water conditioner provided with a membrane is made of a material that can be energized to function as a positive electrode (+ electrode); at least one of the electrolytic water-conditioning electrodes is used as a negative electrode (− electrode); and an electrolytic cleaning voltage is applied to this negative electrode and the membrane positive electrode, thereby cleaning the membrane through elution of the impurities, e.g., calcium, deposited on the membrane into water.

A method is disclosed in Patent Document 5 for recovering the performance of an electrolytic bath that has an anode compartment in which a porous anode is disposed, a cathode compartment and a membrane that partitions the anode compartment from the cathode compartment, wherein this electrolytic bath produces a polysulfide sulfur-containing polysulfide through electrolytic oxidation in which a sulfide ion-containing solution is introduced into the anode compartment and an aqueous solution containing caustic soda is introduced into the cathode compartment. This performance recovery method is characterized by cleaning the anode compartment using an aqueous solution that contains at least one of an inorganic acid, a chelating agent and a scale cleaning agent.

PRIOR TECHNICAL DOCUMENTS

Patent Documents

Patent Document 1: Japanese Patent Application Laid-open No. S61-259754
Patent Document 2: Japanese Patent Application Laid-open No. S53-092981
Patent Document 3: Japanese Patent Application Laid-open No. H11-343106
Patent Document 4: Japanese Patent Application Laid-open No. H07-008954
Patent Document 5: Japanese Patent Application Laid-open No. 2009-242897

SUMMARY

Problems to be Solved by the Disclosure

With reference to an electrolysis system that carries out electrolysis of a white liquor used in the cooking step in a kraft pulp method, which is a pulp production method, in order to electrolytically produce polysulfide through oxidation of the sodium sulfide in the white liquor, the problem for the present disclosure is to provide (1) an electrolysis method that prevents the electrolytic bath voltage from rising over time and that does so without halting or stopping the electrolysis; (2) an electrolysis method that lowers the maintenance frequency and prevents the electrolytic bath voltage from rising over time; and (3) an electrolysis device for implementing these electrolysis methods (1) and (2).

With reference to an electrolytic polysulfide production system including an electrolytic bath for polysulfide production (a white liquor electrolytic bath), peripheral equipment and a piping system, the "maintenance" referred to in this Description means performing the maintenance work and repair work necessary for enabling the system as a whole to retain its performance during its operation. Referring to FIG. 2 as an example here, the "maintenance" referred to in this Description means the maintenance work and repair work carried out to counter the accumulation of deposits in, and the timewise deterioration or aging of, the electrolytic bath, peripheral equipment and piping system shown in FIG. 2 so as to enable these to retain their expected performance.

Considering more specifically the example of an acid wash in a polysulfide-producing electrolysis system including an electrolytic bath for polysulfide production, peripheral equipment and a piping system, this includes the works of, for example, (1) carrying out an acid wash of the interior of the electrolytic bath, the peripheral equipment and/or the piping system; (2) producing wash solution in preparation for carrying out the acid wash; and (3) stopping the system, preparing the wash solution and exchanging solutions; rinsing out the acid wash solution effluent after the acid wash, rinsing out the acid wash solution that remains in the electrolytic bath and piping system, refurnishing the electrolytic solution and restarting. This also includes inspection and replacement of the constituent components (peripheral equipment), such as pumps and pipes that make up the piping system.

The present disclosure relates to a polysulfide production system that carries out an electrolysis treatment on a white liquor used for cooking in a kraft pulp method to thereby produce polysulfide in the white liquor.

Kraft pulp method is widely used in papermaking as a method for producing pulp, raw material for paper, from wood chips. The primary step in the kraft pulp method is a step in which the wood chips are brought into contact, at high temperatures in a digester, with a strongly alkaline solution, known as a white liquor, which contains sodium hydroxide, sodium sulfide and calcium carbonate, causing the lignin components to be dissolved out from the wood chips into the white liquor, and in which separation and washing are performed to obtain the cellulose and hemicellulose that are the major constituent components of pulp.

A cooking method in which polysulfide is added to a white liquor has become known in recent years for improving the yield of cellulose and hemicellulose as paper raw materials in a kraft pulp method. Polysulfide is a substance that can be produced through oxidation of the sodium sulfide in a white liquor. The end groups in the cellulose and hemicellulose are oxidized when pulp cooking is carried out using a polysulfide-containing white liquor, causing dissolution to be suppressed. It is said that this brings about an increase in the pulp yield because pulp components that previously have been dissolved and washed out together with the lignin can be recovered as pulp.

For example, air oxidation, electrolysis, etc., are known as methods for producing polysulfide from white liquor. Of these, the electrolysis method has the following advantages over other polysulfide production methods: it provides for stable production of polysulfide in high concentrations, it has a high current efficiency for polysulfide production, it produces little secondary product such as thiosulfate that is not required by the kraft pulp method, it produces high-purity secondary products such as sodium hydroxide and hydrogen that are useful in the kraft pulp method or papermaking plant, and the members used for the electrolytic bath have long lives.

Wood chips are a natural material and rich in mineral components, e.g., metal salts such as calcium salts and anion components of salts such as sulfate salts and phosphate salts, in addition to cellulose and hemicellulose that are paper raw materials and lignin that is dissolved out in the cooking step. Not only the lignin but also the mineral components are eluted out in large amounts in the cooking process.

When the water used in the steps for carrying out the kraft pulp method, such as white liquor preparation, is river water or groundwater, calcium salts and magnesium salts, known as hardness components, will be present in such water at approximately several tens of milligrams per liter, and these hardness components will also become a mineral component present in the white liquor.

In order to elute the lignin from the wood chips in the digester, the reactions must proceed with the white liquor having undergone a thorough permeation into the wood chips and the dissolved components must be separated from the cellulose and hemicellulose without precipitation of the dissolved components in the digester, and operation is made so that the interior of the digester is maintained to be generally under high temperature condition of 120 to 170° C. and high pressure condition of about 1 MPa. Under the high temperature and high pressure conditions in the interior of the digester, the white liquor supplied to the digester not only absorbs the dissolved lignin, but also dissolves large amounts of the mineral components present in the wood chips.

After separation of the pulp, the white liquor having lignin dissolved, known as black liquor, is transported to a recovery step where it is recovered as raw material for a white liquor and reutilized as white liquor. Here, the mineral components taken into the black liquor are re-incorporated into the white liquor just like the white liquor raw materials.

The mineral components, such as calcium salts and phosphate salts, dissolved in the white liquor form a dense solution almost saturated in the white liquor and are readily deposited as scale on any site on the wetted portions within the polysulfide production system, such as the white liquor production system and electrolytic bath, due to changes in the temperature and/or pressure within the systems. This scale is mainly composed of poorly soluble salts such as calcium phosphate, calcium carbonate or calcium sulfate and, when deposited in a piping system, it causes a reduction in the cross-sectional area of the pipes, thus causing a reduction in the flow rate of the process water, and also causes a reduction in the heat exchange efficiency because these poorly soluble salts have low thermal conductivities.

This scale is also deposited on any site of the wetted portions in the electrolytic bath that produces polysulfide by electrolysis of the white liquor.

Moreover, the flow rate of the process water is reduced when the scale is deposited in the liquor feed and discharge systems, e.g., on the plumbing within the electrolytic bath. In addition, when a plurality of electrolytic baths are disposed in parallel, the flow rates will not be uniform among the individual electrolytic baths and management of uniform electrolysis conditions cannot then be carried out, which as a consequence causes the current efficiency for polysulfide production of the electrolysis device to decline.

When the scale is deposited on the anode surface within the electrolytic bath, the scale-coated portions of the anode make no contribution to the electrolytic reactions because almost all of the scale is nonconductive and lacks a catalytic action that would support electrolysis. Accordingly, the effective electrolysis area is diminished by scale deposition and, in the case of constant-current electrolysis, the anode potential increases in association with this and the bath voltage increases as a result. Since an increase in the anode potential causes an increase in the oxygen production reaction, which is a secondary reaction, and suppresses the polysulfide production reaction and since a chemical reaction between the produced oxygen and polysulfide produces thiosulfate, which does not contribute to raising the yield, the polysulfide production rate at the electrolytic bath declines. In addition, when the bath voltage is raised, both the unit power consumption for polysulfide production and the amount of power used by the electrolysis device increase, thus the cost of pulp production also comes to increase.

When the scale is deposited on the membrane surface within the electrolytic bath, the scale-coated portions cannot come into contact with the white liquor, which is the electrolyte solution, and then do not have an ion permeation capacity. As a consequence, the actual current density on the membrane during energization undergoes an increase and in association with this the voltage drop at the membrane also becomes large, causing a rise in the bath voltage. When the bath voltage rises, both the unit power consumption for polysulfide production and the amount of power used by the electrolysis device increase, thus the cost of pulp production comes to increase.

Either a porous membrane or an ion-exchange membrane can be used as the membrane, but the phenomena that are produced upon scale deposition are the same as above in either case.

It is therefore necessary to prevent scale deposition on the wetted portions in the white liquor electrolysis plant. The deposited scale has heretofore been dissolved and cleaned off by washing with acid and/or by a periodic disassembly and cleaning. However, implementation of these methods entails a lengthy cessation of the operation of the white liquor electrolysis system and/or the pulp production plant, causing a decline in the pulp production productivity. Moreover, not only the scale, but also the parts composing the electrolytic bath, such as the anode, are dissolved by the acid wash and thus undergo deterioration, which raises the frequency of component replacement. Therefore, it is undesirable to perform acid wash frequently.

Under such circumstances, there is demand for an art that brings about long-term, stable operation of the electrolytic bath by stopping scale production through addition of a scale inhibitor and by an effective implementation of scale cleaning through addition of a scale cleaning agent, in order to avoid halt of the electrolytic bath during its operation and provide a low acid wash frequency.

The rise in the bath voltage due to the phenomena described above is considered to be caused by the rise in the electrode potential due to a decline in the actual electrolysis area in the case of the anode and the increase in the resistance due to a decline in the actual electrolysis area in the case of the membrane, respectively. Since both cases have such characteristics that the voltage rises in correspondence to an increase in the current density, the influence exercised on the bath voltage by scale deposition grows larger with each increase in the current density and its influence is exercised in particular when the current density is increased in order to increase polysulfide production.

The present disclosure (1) is an electrolysis method of preventing the voltage of an electrolytic bath from rising over time without halting or stopping electrolysis, the method comprising: in operation of a two-compartment electrolytic bath, which has a membrane with which an anode compartment is partitioned from a cathode compartment and in which a sulfide ion-containing white liquor for use in a pulp production process is fed into the anode compartment while direct current is supplied to the electrolytic bath to produce polysulfide in the anode compartment through electrolysis, feeding a sulfide ion-containing white liquor for use in a pulp production process to the anode compartment, the sulfide ion-containing white liquor containing at least one of a scale cleaning agent and a scale inhibitor.

The present disclosure (2) is an electrolysis method of reducing maintenance frequency and preventing the voltage of an electrolytic bath from rising over time, using a two-compartment electrolytic bath, which has a membrane with which an anode compartment is partitioned from a cathode compartment and in which a sulfide ion-containing white liquor for use in a pulp production process is fed into the anode compartment while direct current is supplied to the electrolytic bath to produce polysulfide in the anode compartment through electrolysis; the method comprising: carrying out electrolysis after the anode compartment and an anode solution feed line have been cleaned with an aqueous inorganic acid solution or a scale cleaning agent during a halt of the electrolysis, and feeding, during the afterward electrolysis, a sulfide ion-containing white liquor for use in a pulp production process containing at least one of a scale cleaning agent and a scale inhibitor to the anode compartment.

The present disclosure (3) is the electrolysis method of preventing the voltage of an electrolytic bath from rising over time without halting or stopping electrolysis according to the present disclosure (1) or (2), characterized in that: the scale cleaning agent in the white liquor contains a chelating agent.

The present disclosure (4) is the electrolysis method of preventing the voltage of an electrolytic bath from rising over time without halting or stopping electrolysis according to the present disclosure (1) or (2), characterized in that: the scale inhibitor in the white liquor contains a maleic acid-type polymer.

The present disclosure (5) is an electrolysis device for implementing an electrolysis method of preventing the voltage of an electrolytic bath from rising over time without halting electrolysis, wherein the electrolysis is performed so that: in operation of a two-compartment electrolytic bath, which has a membrane with which an anode compartment is partitioned from a cathode compartment and in which a sulfide ion-containing white liquor for use in a pulp production process is fed into the anode compartment while direct current is supplied to the electrolytic bath to produce polysulfide in the anode compartment through electrolysis, a sulfide ion-containing white liquor for use in a pulp production process is fed to the anode compartment, the sulfide ion-containing white liquor containing at least one of a scale cleaning agent and a scale inhibitor.

The present disclosure (6) is an electrolysis device for implementing an electrolysis method of reducing maintenance frequency and preventing the voltage of an electrolytic bath from rising over time, the electrolysis being performed so that, using a two-compartment electrolytic bath, which has a membrane with which an anode compartment is partitioned from a cathode compartment and in which a sulfide ion-containing white liquor for use in a pulp production process is fed into the anode compartment, direct current is supplied to the electrolytic bath to produce polysulfide in the anode compartment through electrolysis; wherein the electrolysis is carried out after the anode compartment and an anode solution feed line have been cleaned with an aqueous inorganic acid solution or a scale cleaning agent during a halt of the electrolysis, and a sulfide ion-containing white liquor for use in a pulp production process containing at least one of a scale cleaning agent and a scale inhibitor is fed to the anode compartment during the afterward electrolysis.

The present disclosure (7) is the electrolysis device for implementing an electrolysis method of reducing maintenance frequency and preventing the voltage of an electrolytic bath from rising over time according to the present disclosure (5) or (6), characterized in that the scale cleaning agent in the white liquor during electrolysis contains a chelating agent.

The present disclosure (8) is the electrolysis device for implementing an electrolysis method of reducing maintenance frequency and preventing the voltage of an electrolytic bath from rising over time according to the present disclosure (5) or (6), characterized in that the scale inhibitor in the white liquor during electrolysis contains a maleic acid-type polymer.

The present disclosure can bring about the long-term, stable operation of the electrolytic bath by stopping scale production through the addition of a scale inhibitor and by an effective implementation of scale cleaning through the addition of a scale cleaning agent, in order to avoid halt or stoppage of the electrolytic bath during its operation and provide a low acid wash frequency.

EMBODIMENTS OF THE DISCLOSURE

Figure 1:
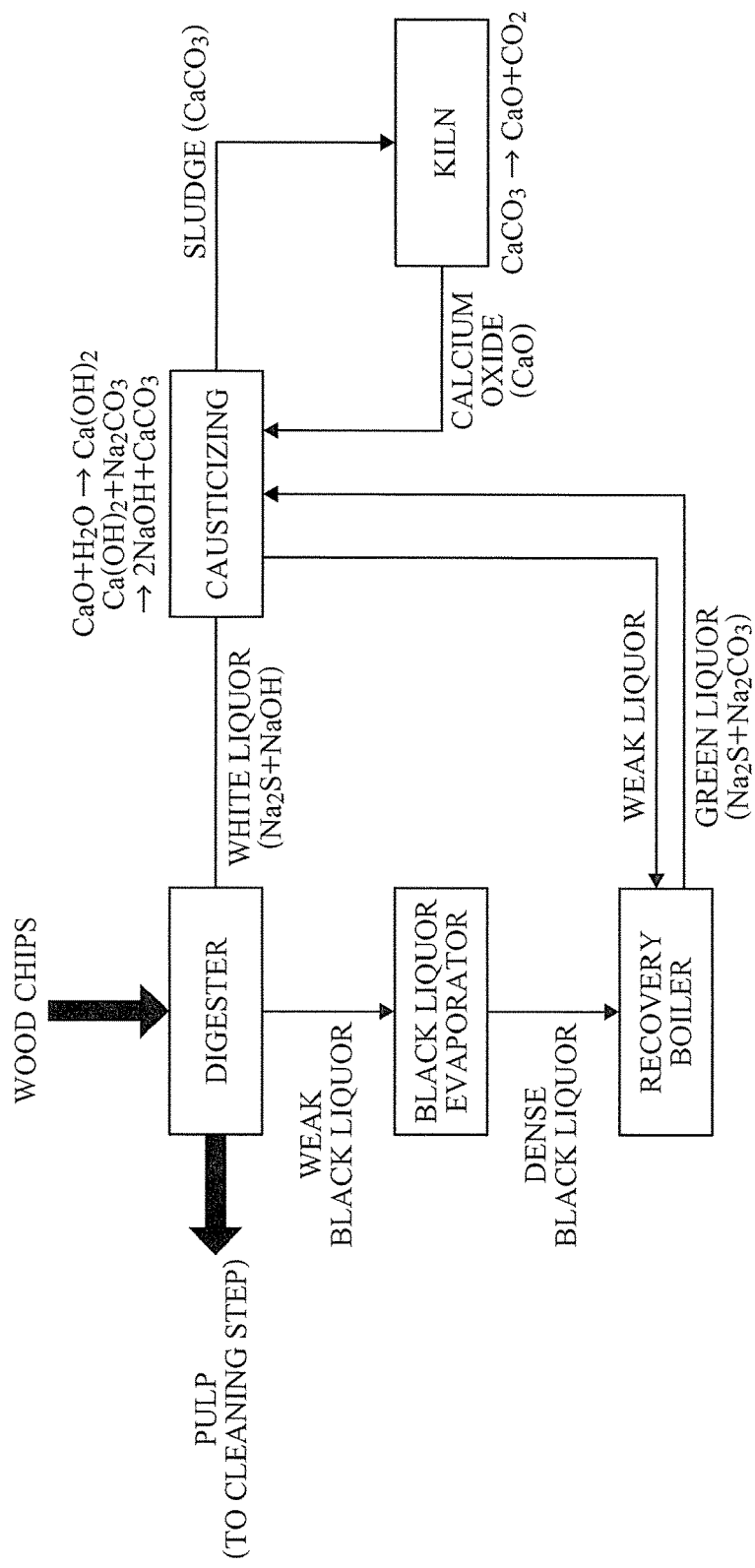
FIG. 1 is a diagram showing a recovery flow for a cooking liquor in a KP method.

Embodiments and modes for carrying out the present disclosure will be described in sequence below. FIG. 1 is a diagram showing the recovery flow for the cooking liquor in the kraft pulp (KP) method.

In the cooking shown in FIG. 1, wood chips and white liquor are fed to a digester and the wood chips are impregnated with the white liquor with reaction occurring therebetween at high temperatures and high pressures, causing lignin to be dissolved out from the wood chips and separating pulp as solids. The black liquor discharged from the cooking step contains, inter alia, lignin, mineral fraction from the wood chips and the white liquor after its reaction.

When the black liquor is discharged from the cooking step, it contains dissolved components in a concentration of over 10%; and it is burned in the recovery boiler after it is concentrated in the black liquor evaporator to a concentration exceeding 70%. The heat generated by this combustion is supplied in the form of, for example, steam, to various processes in the pulp mill, while the combustion ash is dissolved in a weak liquor produced in causticizing to give green liquor. While the green liquor contains as its main components sodium sulfide and sodium carbonate, which are raw materials for white liquor, it also incorporates the mineral fraction present in the black liquor.

When the green liquor is mixed with calcium oxide in causticizing, the sodium carbonate in the green liquor reacts with the calcium hydroxide produced from the calcium oxide and water and is converted into sodium hydroxide and calcium carbonate; the calcium carbonate is separated as sludge to obtain white liquor. This white liquor contains sodium sulfide, sodium hydroxide and calcium carbonate as its main components. A portion of the mineral fraction incorporated from the green liquor is separated in the sludge, while a portion is present in the white liquor and supplied as such to the digester. These mineral components and the calcium carbonate cause scale production.

Figure 2:
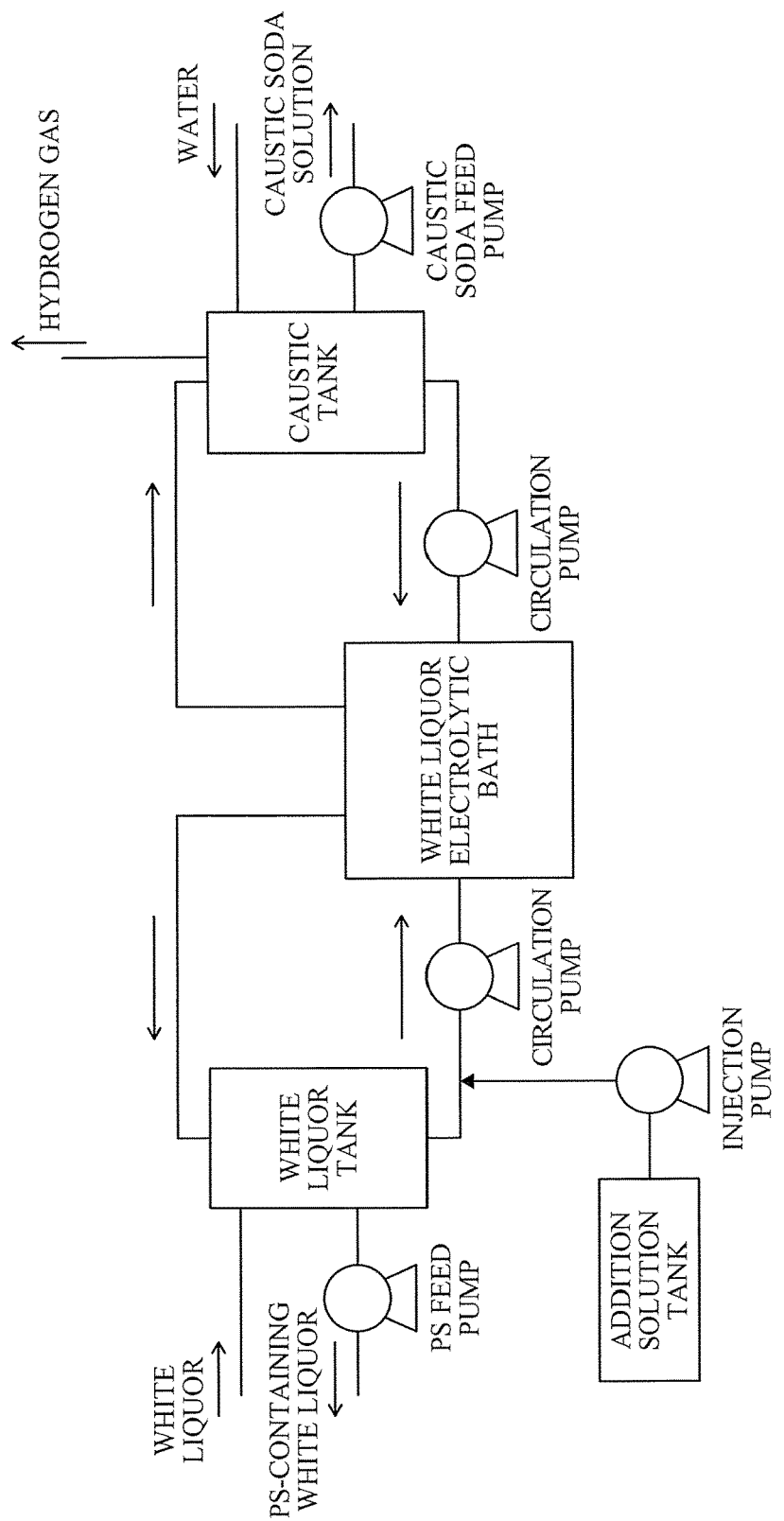
FIG. 2 is a diagram showing flows for a white liquor electrolytic bath and its periphery.
Figure 3:
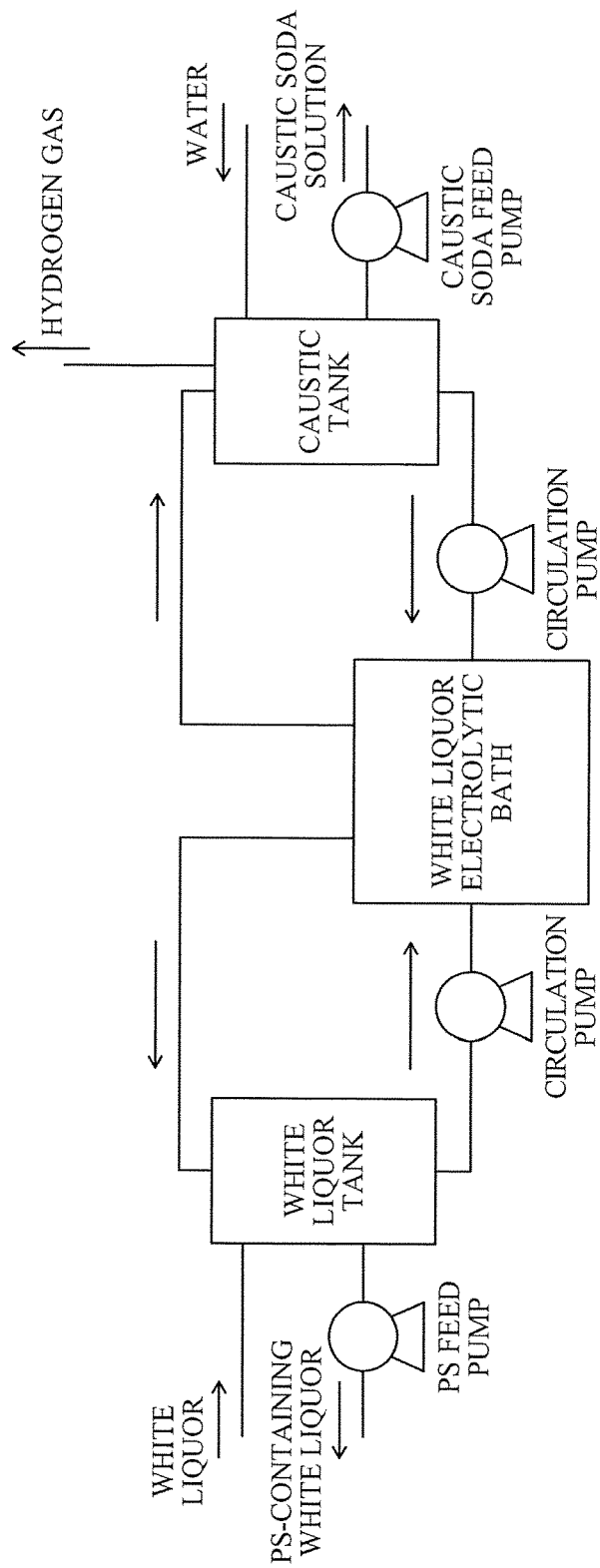
FIG. 3 is a diagram showing flows for a white liquor electrolytic bath prior and its periphery prior to the present disclosure.
Figure 4:
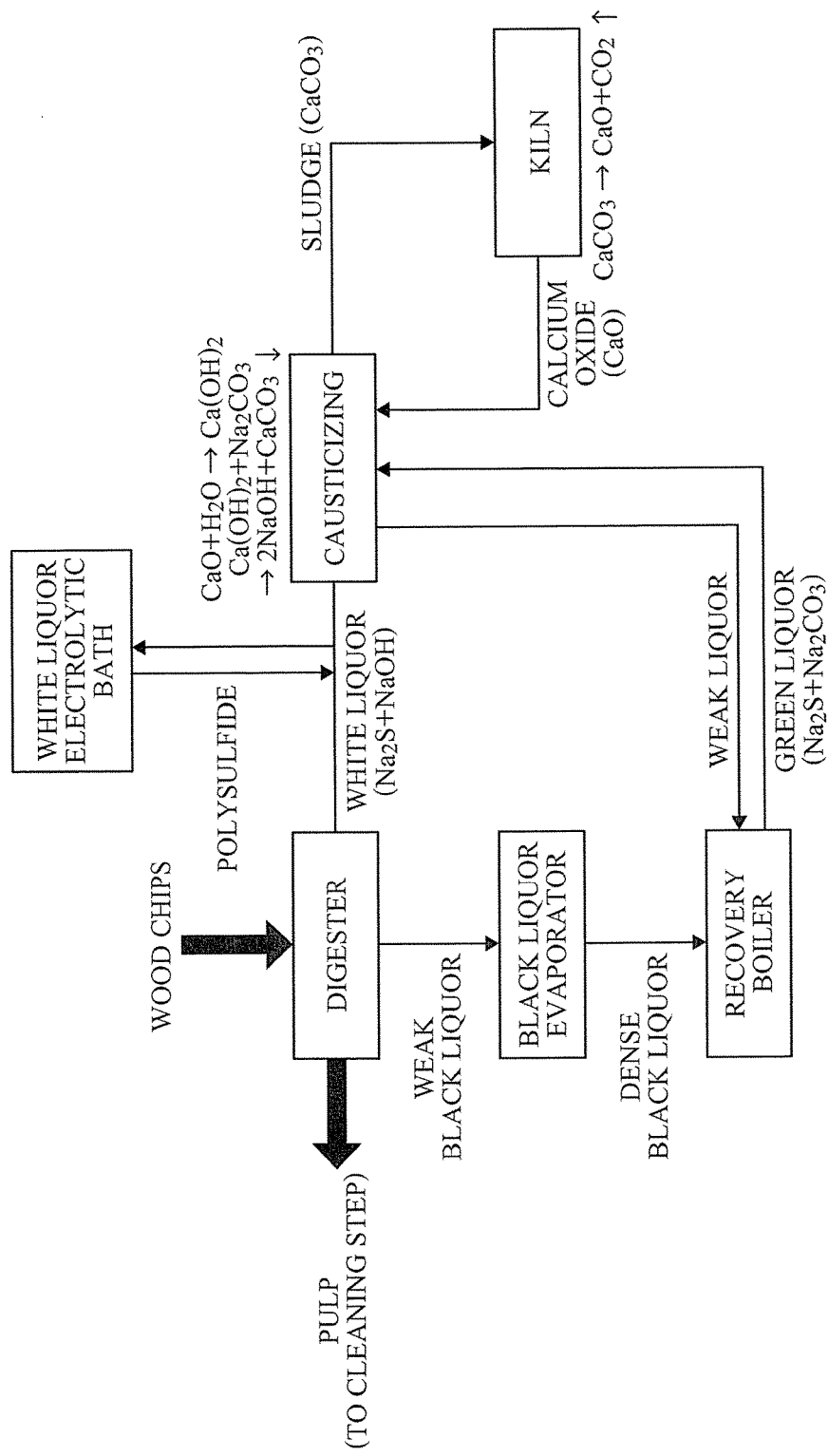
FIG. 4 is a diagram showing the position and use mode for a white liquor electrolytic bath.

FIG. 2 is a diagram showing the flows for a white liquor electrolytic bath and its periphery to which the present disclosure is applied. In contrast to this, FIG. 3 is a diagram showing the flows for a white liquor electrolytic bath and its periphery prior to application of the present disclosure. FIG. 4 is a diagram showing the position and use mode for a white liquor electrolytic bath.

The system is composed of: a white liquor tank that receives a feed of white liquor from the midway of the piping that feeds the white liquor from the causticizing step to the cooking step; a white liquor electrolytic bath that carries out electrolysis on the white liquor to produce polysulfide; a circulation line and circulation pump that feed white liquor from the white liquor tank to the anode compartment of the white liquor electrolytic bath and carry out circulation between the white liquor tank and the white liquor electrolytic bath; a PS feed pump that transports polysulfide-containing white liquor from the white liquor tank to the cooking step; a caustic tank that stores sodium hydroxide (caustic soda) produced by electrolysis in the cathode compartment of the white liquor electrolytic bath; a circulation line and circulation pump between the white liquor electrolytic bath and the caustic tank; a caustic soda feed pump that feeds the aqueous sodium hydroxide solution produced by electrolysis to various processes in the pulp mill; and an addition solution tank and injection pump that add scale cleaning agent and/or scale inhibitor to the white liquor. The method of addition and position of addition for the scale cleaning agent and/or scale inhibitor that are shown in FIG. 2 are an example and there is no limitation to the method shown in FIG. 2.

The scale cleaning agents and scale inhibitors described in the following are examples of the <scale cleaning agent> and <scale inhibitor> used in the present disclosure.

<Scale Cleaning Agent>

The scale cleaning agent used in the present disclosure should be an aqueous solution capable of removing calcium scale and a scale cleaning agent that has a low corrosiveness for white liquor-wetted components, e.g., the anode, anode compartment, piping, pumps and so forth, is desirable. Use of an aqueous solution that results in deterioration of the anode through dissolution and/or coating of the surface with by-products is undesirable since problems are then produced from an operational standpoint such that the surface area of the anode itself or the effective electrolysis area of the anode surface decreases, the bath voltage is raised or by-products are produced, and since the anode replacement frequency also increases. Although an aqueous hydrochloric acid solution may be used as a scale cleaning agent, this is undesirable because the anode ends up in dissolving at the same time that the scale cleaning effect is exercised, as noted above. A preferred scale cleaning agent contains a chelating agent as a dissolved component, where an ethylenediaminetetraacetate or a hydroxyethylethylenediaminetriacetate and so forth can be used as the chelating agent. A specific example is Depoclean 505G (from Kurita Water Industries Ltd.), but there is no particular limitation thereon. Since the white liquor is an alkaline aqueous solution, a scale cleaning agent that provides a cleaning effect even under alkaline conditions is desirable. However, there is no particular limitation as long as it is in use for scale cleaning.

<Scale Inhibitor>

The scale inhibitor used in the present disclosure should be an aqueous solution that has the ability to inhibit the precipitation of calcium scale, and a scale inhibitor that has a low corrosiveness for white liquor-wetted components, e.g., the anode, anode compartment, piping, pumps and so forth, is desirable. Use of an aqueous solution that results in deterioration of the anode through dissolution and/or coating of the surface with by-products is undesirable since problems are then produced from an operational standpoint such that the surface area of the anode itself or the effective electrolysis area of the anode surface decreases, the bath voltage is raised or by-products are produced, and since the anode replacement frequency also increases. A preferred scale inhibitor contains a maleic acid polymer as a dissolved component, and a specific example is Depoclean 830 (from Kurita Water Industries Ltd.), but there is no particular limitation thereon. Since the white liquor is an alkaline aqueous solution, a scale inhibitor that provides a scale-inhibiting effect even under alkaline conditions is desirable. The amount of addition of the scale cleaning agent and scale inhibitor to the white liquor is preferably 1 to 100 mg/L with reference to the white liquor and more preferably 1 to 50 mg/L with reference to the white liquor.

WORKING EXAMPLES

<The Electrolytic Bath>

Figure 5:
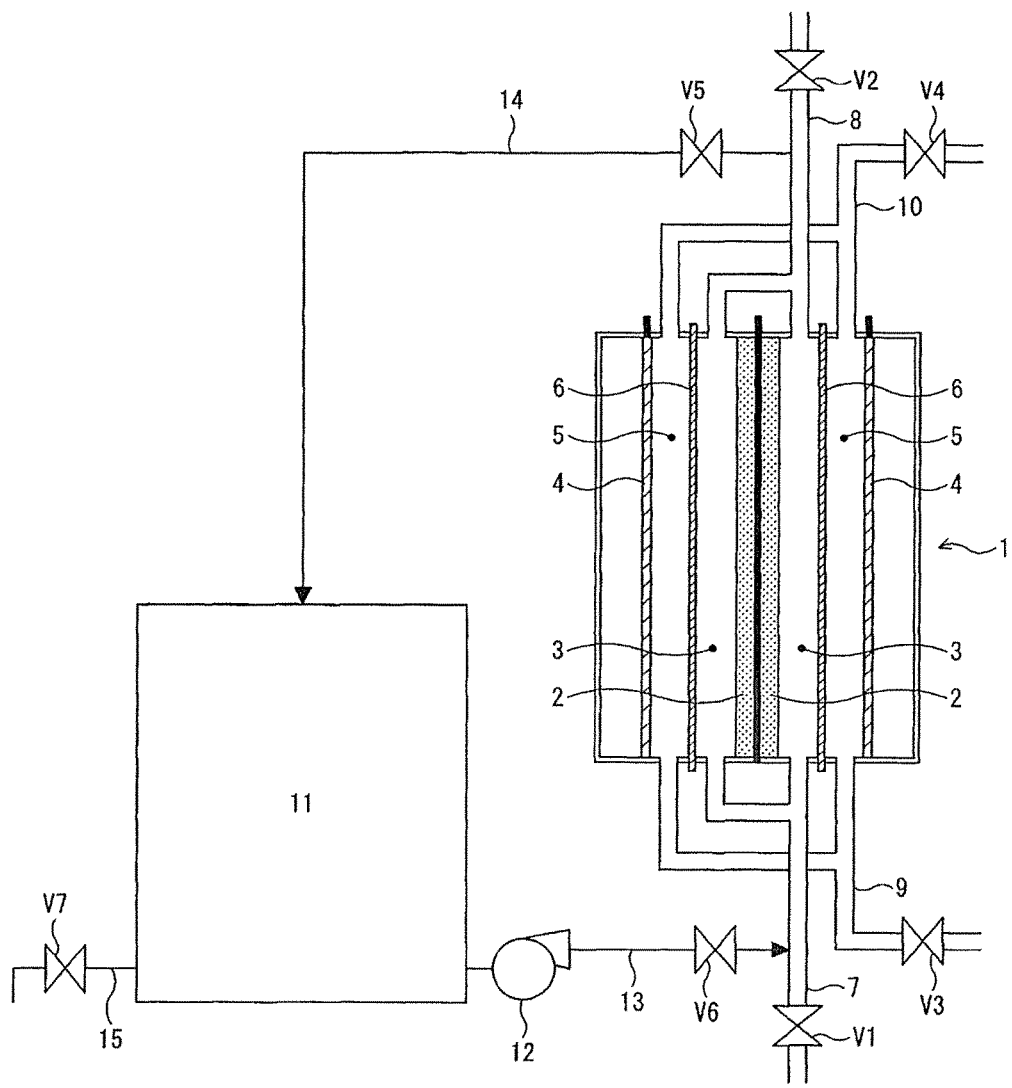
FIG. 5 is a diagram showing the electrolytic bath used in the Working Examples and Comparative Example.

A schematic diagram of the electrolytic bath and anode compartment cleaning device used in the working examples and comparative example is shown in FIG. 5, including the associated plumbing and so forth. This electrolytic bath is similar to one disclosed in Patent Document 5. In FIG. 5, 1 denotes an electrolytic bath, shown in its vertical cross section, 2 denotes an anode, 3 denotes an anode compartment, 4 denotes an cathode, 5 denotes a cathode compartment and 6 denotes a membrane. An anode solution feed line 7 equipped with a valve V1 and an anode solution discharge line 8 equipped with a valve V2 are disposed at the anode compartment 3. A cathode solution feed line 9 equipped with a valve V3 and a cathode solution discharge line 10 equipped with a valve V4 are disposed at the cathode compartment 5. 11 denotes a cleaning solution tank, 12 denotes a cleaning solution pump, 13 denotes a cleaning solution feed line and 14 denotes a cleaning solution discharge line. The horizontal cross section of the electrolytic bath 1 is rectangular and is symmetrical around the anode 2.

Shut-off valves V1 to V6 are disposed in these lines, and the individual steps of electrolytic oxidation, halt or stoppage, discharge and removal of the polysulfide solution, feed and circulation of the cleaning solution, cleaning, discharge and removal of the cleaning solution, and restart of the electrolytic oxidation are carried out through the operation of these valves. Moreover, 15 denotes a line used for both replenishment of the cleaning solution in the cleaning solution tank 11 and discharge of used cleaning solution, and shut-off valve V7 is disposed therein.

Working Example 1

Without halting or stopping electrolysis, a scale inhibitor (Kurita Water Industries Ltd.: Depoclean 830) was added to provide 3.2 mg/L with reference to the white liquor from the position shown in FIG. 2 to the white liquor electrolytic bath operated to perform continuous electrolysis with the continuous electrolysis maintained. The electrolytic current density was 5.7 kA/m$^2$; the white liquor temperature was 90° C.; and the sodium sulfide concentration in the white liquor was 30 to 35 g/L. When the addition was repeated on 2 days in a week for the scale inhibitor addition frequency, the average bath voltage rise rate for 30 days was 2.4 mV/day. No difference was seen in the current efficiency of polysulfide production according to whether scale inhibitor was added or not.

Working Example 2

Without stopping electrolysis, a scale inhibitor (Kurita Water Industries Ltd.: Depoclean 830) was added to provide 3.2 mg/L with reference to the white liquor from the position shown in FIG. 2 to the white liquor electrolytic bath operated to perform continuous electrolysis with the continuous electrolysis maintained. The electrolytic current density was 5.7 kA/m$^2$; the white liquor temperature was 90° C.; and the sodium sulfide concentration in the white liquor was 30 to 35 g/L. The addition was repeated on 2 days in a week for the scale inhibitor addition frequency. In addition, a scale cleaning agent (Kurita Water Industries Ltd.: Depoclean 505G) was added once in a week without halting or stopping the electrolysis during the course of the continuous electrolysis to provide 20 g/L in the white liquor tank. Then the average bath voltage rise rate for 30 days was 1.8 mV/day. No difference was seen in the current efficiency of polysulfide production according to whether scale inhibitor was added or not.

Working Example 3

The white liquor electrolytic bath operated to perform continuous electrolysis was halted; the anode solution in the white liquor tank was exchanged for a 10%-sodium hydroxide solution containing a scale cleaning agent (Kurita Water Industries Ltd., Depoclean 505G) by 20 to 50 g/L of; circulation within the anode solution system was carried out for 24 hours; white liquor was subsequently re-introduced into the white liquor tank; and electrolysis was started similarly as in Working Example 1. A scale inhibitor (Kurita Water Industries Ltd.: Depoclean 830) was also added to provide 3.2 mg/L with reference to the white liquor from the point of the restart of the electrolysis similarly as carried out in Working Example 1 with the continuous electrolysis maintained. The electrolytic current density was 5.7 kA/m$^2$; the white liquor temperature was 90° C.; and the sodium sulfide concentration in the white liquor was 30 to 35 g/L.

The addition was repeated on 2 days in a week for the scale inhibitor addition frequency. When this was done, the average bath voltage rise rate for 30 days was 1.3 mV/day. In addition, the anode elution rate associated with cleaning was not more than 0.05%.

Comparative Example 1

The white liquor electrolytic bath engaged in continuous hydrolysis was halted; the anode solution in the white liquor tank was changed over to 0.7% hydrochloric acid and the cathode solution in the cathode solution tank was changed over to pure water; circulation was carried out for 45 minutes; white liquor was subsequently re-introduced into the white liquor tank and a 10%-sodium hydroxide solution was re-introduced into the cathode solution tank; and electrolysis was started similarly as in Working Example 1. When this was done, the average bath voltage rise rate for 30 days was 9.3 mV/day. In addition, the anode elution rate associated with cleaning was 1.5%.

The invention claimed is:

1. An electrolysis method of reducing maintenance frequency and preventing the voltage of an electrolytic bath from rising over time, using a two-compartment electrolytic bath, which has a membrane with which an anode compartment is partitioned from a cathode compartment and in which a sulfide ion-containing white liquor for use in a pulp production process is fed into the anode compartment while direct current is supplied to the electrolytic bath to produce polysulfide in the anode compartment through electrolysis; the method comprising:
carrying out electrolysis after the anode compartment and an anode solution feed line have been cleaned with an aqueous inorganic acid solution or a scale cleaning agent during a halt of the electrolysis, and
feeding, during the afterward electrolysis, at least one of a scale cleaning agent and a scale inhibitor to the sulfide ion-containing white liquor for use in the pulp production process during circulation of the sulfide ion-containing white liquor in between a white liquor tank and the anode compartment.

2. The electrolysis method of reducing maintenance frequency and preventing the voltage of an electrolytic bath from rising over time according to claim 1, characterized in that:
the scale cleaning agent in the white liquor contains a chelating agent.

3. The electrolysis method of reducing maintenance frequency and preventing the voltage of an electrolytic bath from rising over time according to claim characterized in that:
the scale inhibitor in the white liquor contains a maleic acid-type polymer.

* * * * *